(12) United States Patent
Bastiyali

(10) Patent No.: US 12,515,615 B2
(45) Date of Patent: Jan. 6, 2026

(54) SYSTEM FOR ENSURING SAFE DRIVING

(71) Applicant: Smartsafe Console, LLC, Las Vegas, NV (US)

(72) Inventor: Tarkan Bastiyali, New York, NY (US)

(73) Assignee: SMARTSAFE CONSOLE, LLC, Las Vegas, NV (US)

( * ) Notice: Subject to any disclaimer, the term of this patent is extended or adjusted under 35 U.S.C. 154(b) by 0 days.

(21) Appl. No.: 19/081,548

(22) Filed: Mar. 17, 2025

(65) Prior Publication Data

US 2025/0242780 A1 Jul. 31, 2025

Related U.S. Application Data

(63) Continuation-in-part of application No. 18/946,540, filed on Nov. 13, 2024, which is a continuation-in-part of application No. 18/425,425, filed on Jan. 29, 2024, now Pat. No. 12,170,740.

(51) Int. Cl.
| | |
|---|---|
| *G06F 17/00* | (2019.01) |
| *B60R 25/04* | (2013.01) |
| *B60R 25/24* | (2013.01) |
| *B60R 25/25* | (2013.01) |
| *B60R 25/30* | (2013.01) |

(52) U.S. Cl.
CPC .............. *B60R 25/24* (2013.01); *B60R 25/04* (2013.01); *B60R 25/25* (2013.01); *B60R 25/305* (2013.01)

(58) Field of Classification Search
CPC ......... B60R 25/24; B60R 25/04; B60R 25/25; B60R 25/305
USPC ......................................................... 701/36
See application file for complete search history.

(56) References Cited

U.S. PATENT DOCUMENTS

| | | | | |
|---|---|---|---|---|
| 10,538,220 | B1* | 1/2020 | Tyagi | B60R 25/245 |
| 12,049,134 | B2* | 7/2024 | Bastiyali | B60R 16/03 |
| 12,275,303 | B2* | 4/2025 | Bastiyali | B60R 7/087 |
| 12,296,840 | B2* | 5/2025 | Krome | B60W 50/0098 |
| 2019/0158652 | A1* | 5/2019 | Isgar | H04M 1/72463 |
| 2020/0079322 | A1* | 3/2020 | Crocker | G07C 9/00571 |
| 2020/0164897 | A1* | 5/2020 | Krome | B60W 50/14 |
| 2022/0276066 | A1* | 9/2022 | Beaurepaire | G01C 21/3492 |
| 2023/0356587 | A1* | 11/2023 | Bastiyali | E05B 83/32 |
| 2024/0187241 | A1* | 6/2024 | Garcia | B60R 25/252 |

(Continued)

OTHER PUBLICATIONS

Human Factors Design Guidance for Driver-Vehicle Interfaces (Year: 2016).*

*Primary Examiner* — Ronnie M Mancho
(74) *Attorney, Agent, or Firm* — Hsuanyeh Law Group, PC

(57) ABSTRACT

A device housing system contained within a vehicle is provided herein, the device housing system including a front surface, a back surface, a first side member, a second side member, a top member, a bottom member, and a control module configured to communicate with a motion detection mechanism of the vehicle and with an internet-enabled device. The front surface, the first side member, the second side member, and the bottom member define a placement slot for the internet-enabled device, the placement slot being configured to support the internet-enabled device. The device housing system prevents a user from operating an internet-enabled device when the vehicle is in motion, and thus, limits distracted driving. The device housing system also prevents operation of the vehicle unless certain conditions are met.

20 Claims, 16 Drawing Sheets

(56) References Cited

U.S. PATENT DOCUMENTS

2024/0278642 A1* 8/2024 Bastiyali .................. B60R 7/04
2025/0091519 A1* 3/2025 Bastiyali ................. B60R 7/087

* cited by examiner

SYSTEM FOR ENSURING SAFE DRIVING

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

CLAIM OF PRIORITY

This application is a continuation-in-part of U.S. patent application Ser. No. 18/946,540, entitled "SYSTEM FOR ENSURING SAFE DRIVING BY YOUNG DRIVERS", filed on Nov. 13, 2024, which is a continuation-in-part of U.S. patent application Ser. No. 18/425,425, entitled "SYSTEM FOR ENSURING SAFE DRIVING", filed on Jan. 29, 2024, the contents of both of which are hereby incorporated by reference in their entirety.

FIELD OF THE EMBODIMENTS

The present disclosure relates generally to the fields of vehicle safety and electronic devices. More specifically, the present disclosure relates to electronic device housing systems that assist with safe driving.

BACKGROUND

Many vehicle accidents are caused by distracted drivers using electronic devices while driving. Most current device housing systems act as only temporary placeholders for internet-enabled devices, fail to disable electronic devices placed thereon, and do not change the state of the internet-enabled electronic device depending on the state of a vehicle's motion. Therefore, a need exists for a device housing system which renders an internet-enabled device placed thereon inoperable when a vehicle attached to the device housing system is in motion.

SUMMARY OF THE INVENTION

The present disclosure provides for a method of ensuring safe driving by a young driver. In some embodiments, the method in accordance with the present disclosure begins with the step of providing, a device housing system contained within a vehicle, the device housing system comprising a placement slot configured to receive and support an internet-enabled electronic device and then having the young driver enter this vehicle. Then, the electronic device is registered with the device housing system, thereby creating a wireless electronic communication channel therebetween. The user then places an internet-enabled electronic device of the driver into the placement slot and then the method proceeds to automatically transmit an anti-theft code to the internet-enabled electronic device upon placement of the internet-enabled electronic device. The anti-theft code is then entered into a graphical user interface presented on the internet-enabled electronic device. In embodiments the young driver will then fasten their seatbelt. Then, the device housing system will use one or more software applications on the internet-enabled electronic device to prevent operation of the vehicle, where said one or more software applications are ordinarily accessible by the young driver utilizing the internet-enabled electronic device. Embodiments of the method then proceed to the step of permitting, upon verification of the anti-theft code and verification of the young driver's seatbelt, by the device housing system, operation of the vehicle.

Embodiments exist where the internet-enabled electronic device has at least one camera, and wherein the step of registering the electronic device with the device housing system is performed via the at least one camera scanning an optical identifier located on the device housing system. In such embodiments, the method in accordance with the present disclosure can include the steps of sensing by the device housing system if the internet-enabled device is within the placement slot and subsequently preventing operation of the vehicle, by the device housing system, if the internet-enabled device is removed from the placement slot. In embodiments, the one or more cameras can assess whether a second internet-enabled electronic device is located within the vehicle as well as whether a human driver is present within the vehicle, and preventing operation of the vehicle, by the device housing system upon detection of the second internet-enabled electronic device. In some embodiments, the method in accordance with the present disclosure includes the step of providing a second graphical user interface for allowing the driver to catalog any damage to the vehicle or other hazards.

In other embodiments, a method of ensuring safe driving by a commercial driver of a vehicle is disclosed. In such embodiments, the method in accordance with the present disclosure can begin with providing, a device housing system contained within a vehicle, the device housing system comprising a placement slot configured to receive and support an internet-enabled electronic device. In some embodiments, the next step is to perform a pre-trip inspection checklist by the commercial driver and then the results of this inspection are entered into a pre-trip inspection checklist into a software application on the internet-enabled electronic device. In embodiments, the commercial driver then enters the vehicle and subsequently registers the electronic device with the device housing system, thereby creating a wireless electronic communication channel therebetween. The electronic device is then placed into the placement slot and an anti-theft code is automatically transmitted to the internet-enabled electronic device upon placement of the internet-enabled electronic device. In some embodiments, the anti-theft code is entered into a graphical user interface presented on the internet-enabled electronic device. In various embodiments, the device housing system prevent access to one or more software applications on the internet-enabled electronic device, where said one or more software applications are ordinarily accessible by the young driver utilizing the internet-enabled electronic device. Upon verification of the anti-theft code and verification of the commercial driver's seatbelt being fastened, the device housing system permits operation of the vehicle.

The present disclosure also provides for a method of ensuring safe driving by a young driver. Certain embodiments begin by first providing a device housing system contained within a vehicle, comprising a front surface, a back surface, a first side member, having a first upper end and a first lower end, the first side member extending between the back surface and the front surface, a second side member, having a second upper end and a second lower end, the second side member extending between the back surface and the front surface, a top member, extending between the back surface and the front surface, and connected to the first upper end and the second upper end, a bottom member, extending between the back surface and the front surface, and connected to the first lower end and the second lower end, and a control module configured to communicate with a motion detection mechanism of the vehicle and with an internet-enabled device, wherein the front surface, the first side member, the second side member, and the bottom member define a placement slot for the internet-enabled device, wherein the placement slot is open-faced and configured to support the internet-enabled device. The younger driver then enters the vehicle and will place an internet-enabled device such as a mobile device or tablet into the placement slot. The driver will then fasten their seatbelt and, after the device housing system has assessed that the internet-enabled device is in the placement slot and the driver's seatbelt has been fastened, will permit operation of the vehicle. If both of these conditions have not been met, the device housing system will prevent operation of the vehicle. Embodiments exist where all occupants of the vehicle must fasten their seatbelts in order for operation of the vehicle to be permitted. Embodiments exist where all occupants of the vehicle must place their internet-enabled electronic devices into one or more placement slots located on the device housing system. In various embodiments, operation of the vehicle means permitting the vehicle to start, and in other embodiment operation of the vehicle means permitting the vehicle to be shifted into a driving mode. Embodiments exist where the device housing system in accordance with the present disclosure continuously monitors for the internet-enabled device remaining in the placement slot. Should said device housing system detect that the internet-enabled device has been removed from the placement slot, operation of the vehicle is no longer permitted. Embodiments exist where this is achieved by slowing down the vehicle until it has stopped. Other embodiments exist where the vehicle is slowed and is also forced to veer off to the side.

Embodiments exists where the method of ensuring safe driving by a young driver includes the device housing system in accordance with the present disclosure preventing any audio from being emitted by the vehicle. In some embodiments, a super user, such as a parent of the young driver may separately register with the device housing system. In these embodiments, the super user can authenticate via a registered device such as an authorized mobile device or specially configured RFID chip. In such instances, the super user may bypass the restrictions on operation. Embodiments exist where the young driver must enter a pin into the device housing system to initiate a driving session. In some embodiments, the device housing system further comprises a breathalyzer and young drivers will be required to blow into the device to determine their blood alcohol content (BAC) is within legal limits within their jurisdiction.

In other embodiments, the method in accordance with the present disclosure also includes a step of presenting one or more visual stimuli and then tracking, by an image capture device in electronic communication with the device housing system, one or more eye movements of the driver in relation to the one or more visual stimuli. The method then assesses via a software application performing a horizontal gaze nystagmus test, whether the user is impaired.

The present disclosure also provides for a device housing system contained within a vehicle. The device housing system includes a front surface, a back surface, and a first side member, having a first upper end and a first lower end. In some embodiments, the first side member extends between the back surface and the front surface. Embodiments may contain a second side member, where this second side member has a second upper end and a second lower end, and extends between the back surface and the front surface. Embodiments may also contain a top member which extends between the back surface and the front surface, and is connected to the first upper end and the second upper end. In some embodiments, the device housing system includes a bottom member which extends between the back surface and the front surface, and is connected to the first lower end and the second lower end. Embodiments may also include a control module configured to communicate with a motion detection mechanism of the vehicle and with an internet-enabled device. The front surface, the first side member, the second side member, and the bottom member define a placement slot for the internet-enabled device, the placement slot being configured to support the internet-enabled device.

In some embodiments, the device housing system further includes a first rail extending from the bottom member to the top member along the back surface and a second rail extending from the bottom member to the top member along the back surface. In such embodiments, the first rail and the second rail are configured to actuate the device housing system between a first position and a second position.

In some embodiments, when the device housing system is in the first position, the device housing system is configured to restrict physical access to the internet-enabled device.

In some embodiments, when the device housing system is in the second position, the device housing system is configured to allow for full physical access to the internet-enabled device.

In some embodiments, the control module further includes a transceiver configured to receive a first signal from the motion detection mechanism when the vehicle is in a state of motion and a second signal from the motion detection mechanism when the vehicle is in a state of rest.

In some embodiments, the transceiver is configured to transmit a locking signal to the internet-enabled device disposed on the placement slot when the transceiver receives the first signal. In such embodiments, the locking signal locks the internet-enabled device, thereby preventing access.

In some embodiments, the transceiver is configured to transmit an unlocking signal to the internet-enabled device disposed on the placement slot when the transceiver receives the second signal. In such embodiments, the unlocking signal provides access to the internet-enabled device.

In some embodiments, the device housing system further includes a middle member, located on the placement slot, which defines a first placement sub-slot and a second placement sub-slot, the middle member extending between the top member and the bottom member.

In some embodiments, the middle member is located at a position equidistant from the first side member and the second side member.

In some embodiments, the device housing system further includes a speaker configured to audibly alert a user that the internet-enabled device is disabled.

In some embodiments, the device housing system further includes a digital screen configured to display information to the user.

In some embodiments, the device housing system further includes a charging unit configured to charge at least one internet-enabled device disposed on the placement slot.

In some embodiments, the placement slot further includes a bottom ridge having a member, the member extending from an intersection of the front surface and the bottom member to beyond the front surface. In such embodiments, the bottom ridge is configured to further support the internet-enabled device from below.

In some embodiments, the device housing system further includes an angle defined by an intersection of the front surface and the bottom member, where the angle is in the range of ninety degrees to one hundred eighty degrees. Preferably, the angle is ninety degrees to one hundred thirty degrees. Most preferably, the angle is ninety degrees to one hundred ten degrees.

In some embodiments, the front surface is manufactured from a material configured to limit the movement of the internet-enabled device placed thereon. In such embodiments, the material is constructed out of one from the group consisting of rubber, polyvinyl chloride, thermoplastic elastomer, thermoplastic polyurethane, foam, sponge, cork, adhesive tape, and non-slip tape.

In some embodiments, the device housing system is constructed out of an antipathogen plastic or antipathogen composite.

The claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

Implementations may include one or a combination of any two or more of the aforementioned features or embodiments.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

BRIEF DESCRIPTION OF THE DRAWINGS

In the drawings, like elements are depicted by like reference numerals. The drawings are briefly described as follows.

FIG. 3A illustrates the flow of communications when a vehicle is in motion and FIG. 3B illustrates the flow of communications when a vehicle is at rest.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete, and fully conveys the scope of the present disclosure to those skilled in the art. In fact, it will be apparent to those skilled in the art that various modifications and variations can be made in the present disclosure without departing from the scope or spirit of the disclosure.

DETAILED DESCRIPTION

Reference will now be made in detail to each embodiment of the invention in accordance with the present disclosure. Such embodiments are provided by way of explanation of the present disclosure, which is not intended to be limited thereto in any manner whatsoever. In fact, those of ordinary skill in the art may appreciate upon reading the present specification and viewing the present drawings that various modifications and variations can be made thereto.

Embodiments of the present disclosure relate to device housing systems for locking an internet-enabled device when a vehicle is in a state of motion, and more particularly to a device housing system for preventing a user from operating the internet-enabled device when the vehicle is in motion. The device housing system in accordance with the present disclosure is particularly beneficial when the user does not have assistance while operating a vehicle, such as when the user is the sole passenger of the vehicle.

In the following embodiments, the user may be an occupant of a vehicle, and more particularly, the user may be the driver of the vehicle.

FIG. 1, FIG. 2, and FIGS. 4 through 7 all show one or more embodiments of the device housing system in accordance with the present disclosure.

Figure 1:
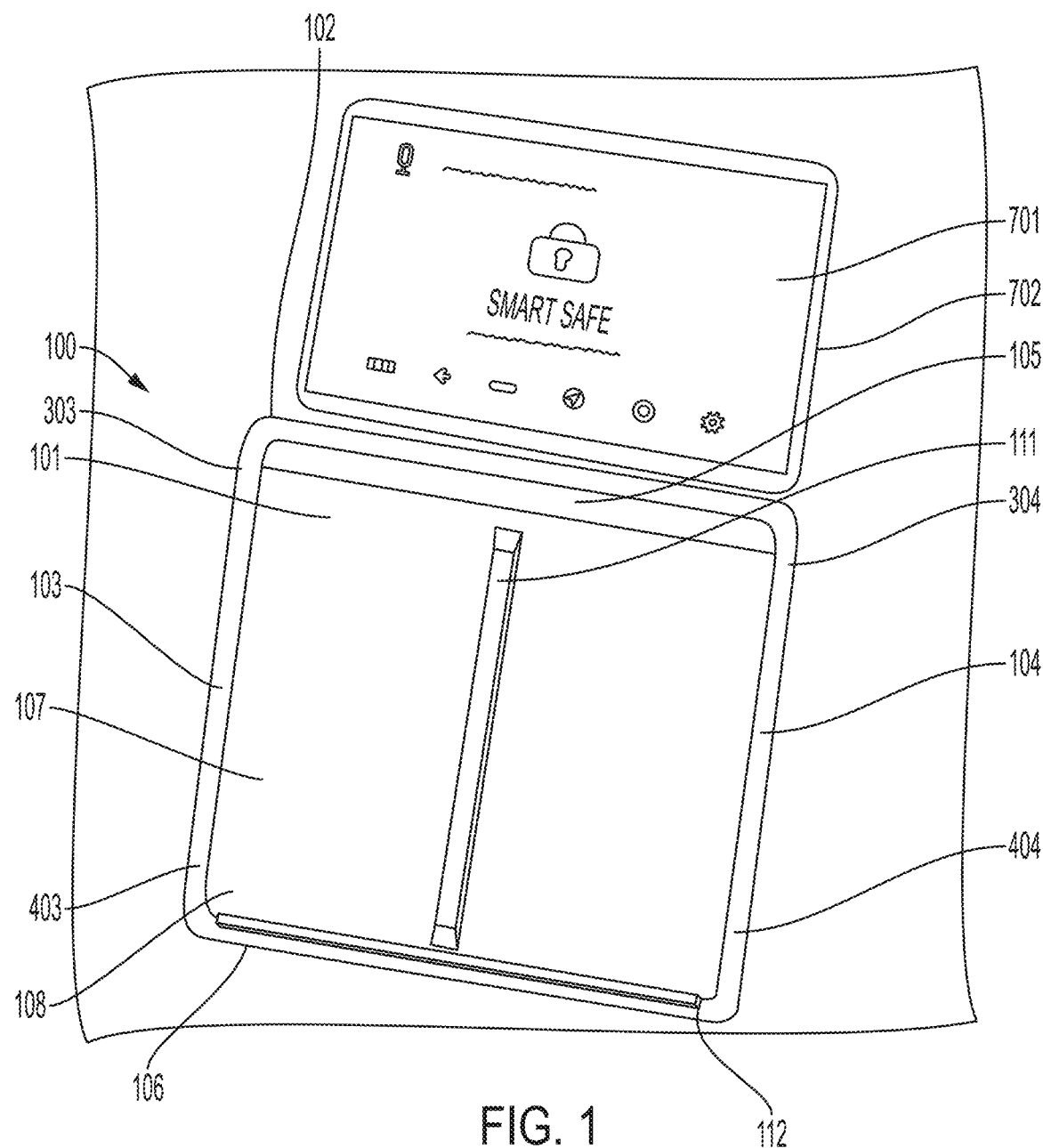
FIG. 1 is a perspective view of a device housing system in accordance with the present disclosure.

As illustrated in FIG. 1, the device housing system 100 includes a front surface 101, a back surface 102, a first side member 103, a second side member 104, a top member 105, and a bottom member 106. The front surface, the first side member, the second side member, and the bottom member define a placement slot 107 for an internet-enabled device 1 (see FIG. 7). The placement slot is configured to support the internet-enabled device placed thereon.

The first side member 103 includes a first upper end 303 and a first lower end 403 and extends between the back surface 102 and the front surface 101. Similarly, the second side member 104 includes a second upper end 304 and a second lower end 404 and extends between the back surface 102 and the front surface 101. In some embodiments, the top member 105 may extend between the back surface 102 and the front surface 101 and is connected to the first upper end 303 and the second upper end 304. Likewise, the bottom member 106 may extend between the back surface 102 and the front surface 101 and is connected to the first lower end 403 and the second lower end 404.

In some embodiments, as further shown in FIG. 1, the device housing system 100 may further include an angle 108 defined by an intersection of the front surface 101 and the bottom member 106. The angle may enable the device housing system to stably support the internet-enabled device 1 on the placement slot 107 via gravity or optionally with the aid of intermolecular forces friction and/or adhesion between the device 1 and the placement slot 107. In some embodiments, the angle is in the range of from ninety degrees to one hundred eighty degrees. Preferably, the angle is in the range of from ninety degrees to one hundred thirty degrees. Even more preferably, the angle is in the range of from ninety to one hundred ten degrees.

Figure 2:
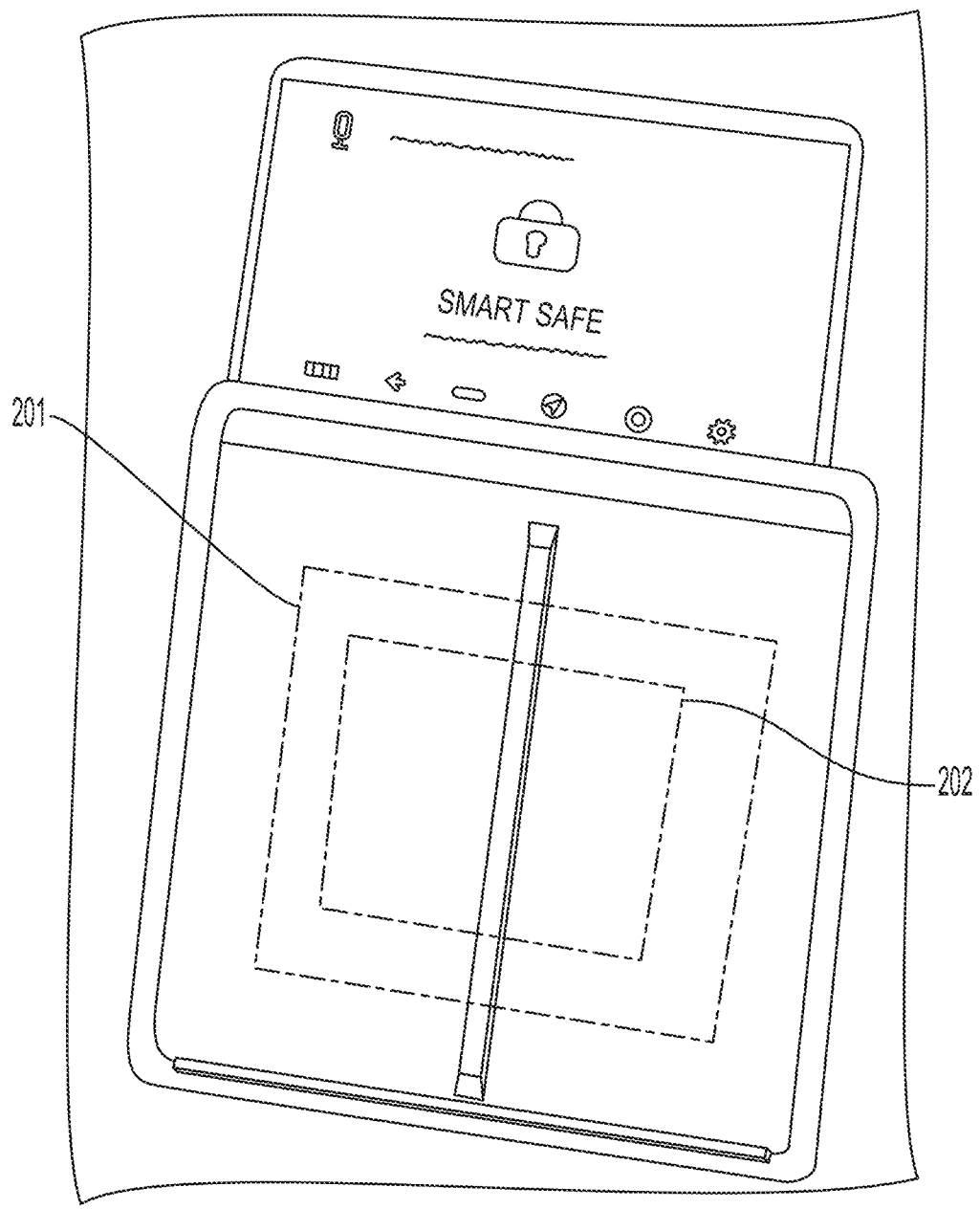
FIG. 2 is an alternative perspective view of the embodiment shown in FIG. 1.

In some embodiments, as illustrated in FIG. 2, the device housing system 100 may further include a control module 201, configured to communicate with the internet-enabled device 1, as well as a motion detection mechanism 10 of the vehicle (not shown in FIG. 2). The internet-enabled device 1 may be a smartphone, a smart watch, or the like.

The motion detection mechanism 10 of the vehicle may include known devices in the art which detect whether the vehicle is in motion. Further, the motion detection mechanism may be a motion detection mechanism provided with the vehicle by the original manufacturer or may be provided by a third-party manufacturer. Accordingly, such flexibility enables the device housing system 100 to be installed in any vehicle, no matter the make or model.

In other embodiments, as further illustrated in FIG. 2, the control module 201 may further include a transceiver 202. The type of transceiver may include any wireless or radio frequency transceiver known in the art. Specifically, the transceiver 202 may be configured to receive a first signal from the motion detection mechanism 10 when the vehicle is in a state of motion. Further, the transceiver may be configured to receive a second signal from the motion detection mechanism when the vehicle is in a state of rest.

The vehicle may be said to be in the state of motion when the motion detection mechanism registers that the vehicle is in motion. For purposes of the present disclosure, even the slightest forward or backward movement of the vehicle may be classified as motion. Alternatively, the vehicle may be said to be in the state of rest when the motion detection mechanism registers no movement of the vehicle.

In some embodiments, the transceiver 202 may be configured to transmit a locking signal to the internet-enabled device 1 disposed on the placement slot 107 when the transceiver receives the first signal. In such embodiments, the locking signal may lock the internet-enabled device. By locking the internet-enabled device, the user may be restricted from fully accessing the internet-enabled device. For example, among others, the user may be denied access to the internet-enabled device's lock screen, home screen, text messaging capabilities, internet capabilities, applications, or any combination thereof.

Similarly, in other embodiments, the transceiver 202 may be configured to transmit an unlocking signal to the internet-enabled device 1 disposed on the placement slot 107 when the transceiver receives the second signal. In such embodiments, the unlocking signal may provide access to the internet-enabled device. When the internet-enabled device is unlocked, the user may be granted full access to the internet-enabled device.

Figures 3A, 3B:
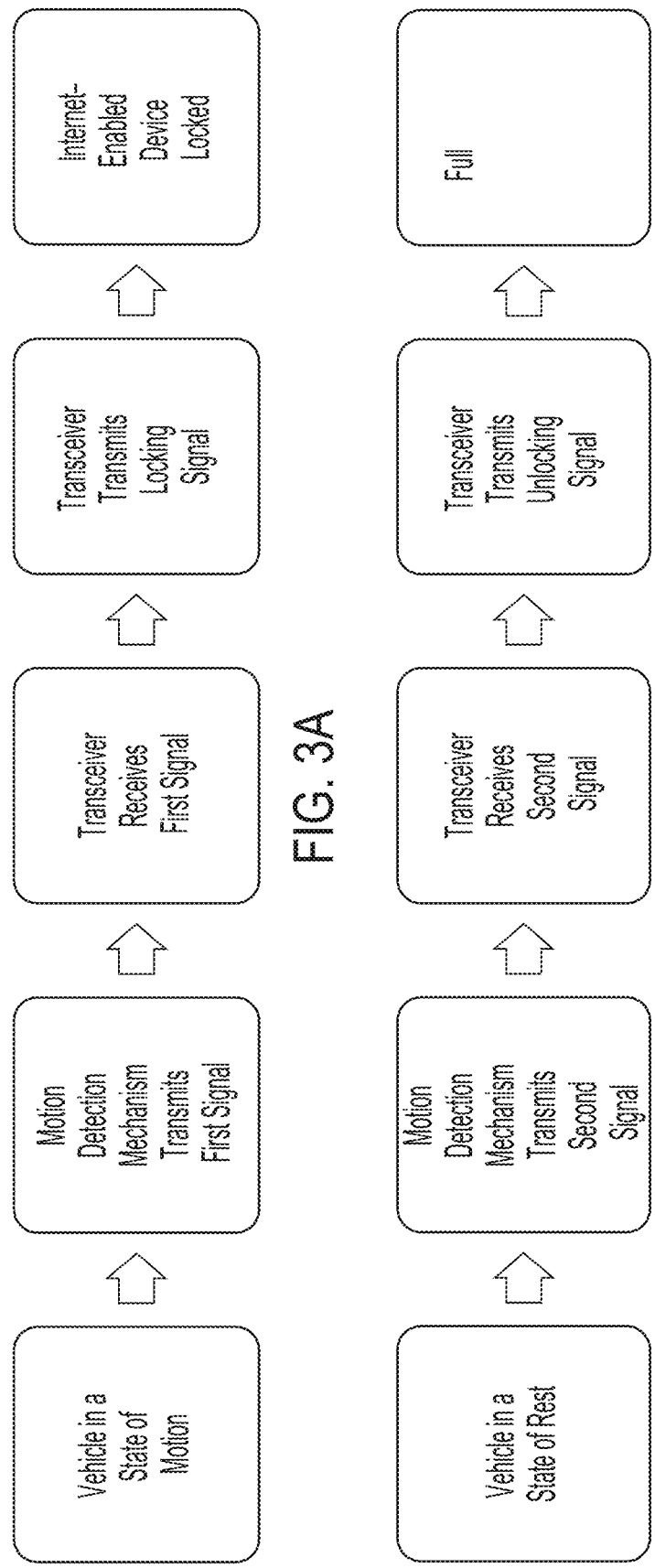
FIGS. 3A and 3B are exemplary schematic views of the flow of communications between a motion detection mechanism, a transceiver, and an internet-enabled device in accordance with the present disclosure, where

FIG. 3 is an exemplary schematic of the flow of communications between the motion detection mechanism 10, the transceiver 202, and the internet-enabled device 1. FIG. 3A illustrates the flow of communications when the vehicle is in motion. FIG. 3B illustrates the flow of communications when the vehicle is at rest.

In other embodiments, the device housing system 100 may be configured to register the user's internet-enabled device 1. In such embodiments, registering the internet-enabled device to the device housing system may require affirmative steps by the user. In other words, registration of the internet-enabled device may not occur automatically. Accordingly, such a configuration may offer advantages, especially when the vehicle transports individuals that may not be frequent passengers of the vehicle. In other words, the device housing system may preferably be configured to lock only the internet-enabled device of a primary user, e.g., a driver, of the vehicle, not its passengers. Moreover, in other embodiments, the device housing system may be configured to register more than one internet-enabled device. Accordingly, such a configuration may be advantageous when multiple individuals utilize the same vehicle.

In some embodiments, the device housing system may be configured to recognize when the registered internet-enabled device is contained within the vehicle. Specifically, the transceiver 202 may be configured to receive a proximity signal from the registered internet-enabled device 1 when the vehicle is running, and when the registered internet-enabled device is located within the vehicle. Specifically, the transceiver may be configured to receive the proximity signal from the registered internet-enabled device when the registered internet-enabled device is located within e.g., twenty, fifteen, ten, etc., feet of the device housing system 100. In such embodiments, the proximity signal may be any form of electronic communication known in the art.

In some embodiments, the vehicle cannot be placed in motion until the registered internet-enabled device 1, identified to be located within the vehicle by the proximity signal, is disposed on the placement slot 107. In such embodiments, the transceiver 202 may be configured to receive a placement signal from the registered internet-enabled device when the internet-enabled device is disposed on the placement slot. Further, the transceiver may be configured to transmit a motion-enabling signal to the vehicle when the transceiver receives the placement signal. In such embodiments, the motion-enabling signal may enable the vehicle to be placed in motion. For example, the vehicle can be placed in drive, reverse, or neutral.

In a case where two or more internet-enabled devices registered to different users are simultaneously located within the vehicle, one of the users may be required to select the internet-enabled device of the driver on the digital screen 701. Accordingly, in such an event, the vehicle cannot be placed in motion until the registered internet-enabled device of the driver is disposed on the placement slot. Alternatively, in a case where two or more registered internet-enabled devices to the same user are simultaneously located within the vehicle, the vehicle cannot be placed in motion until both the registered internet-enabled devices are disposed on the placement slot.

Figure 4A:
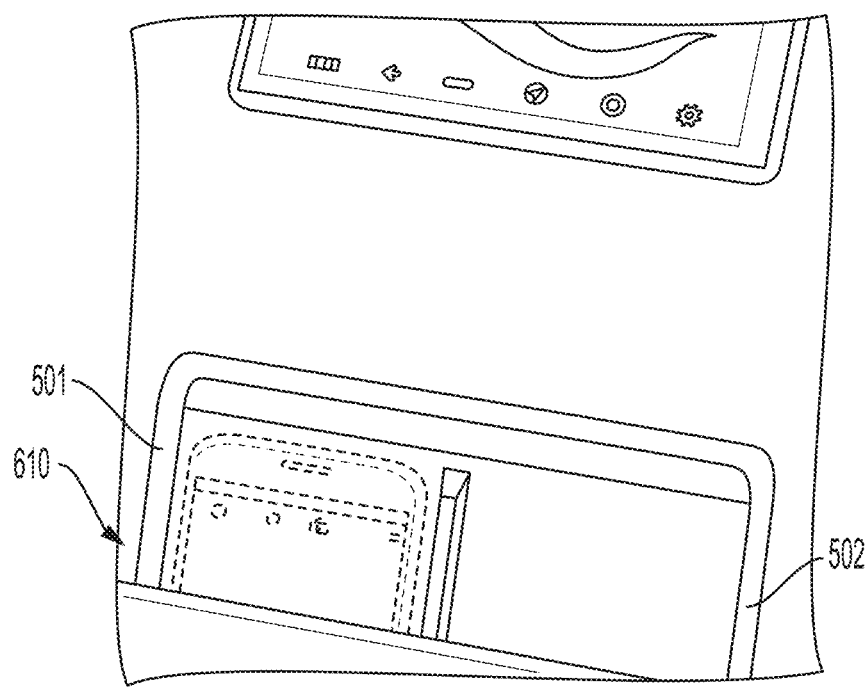
FIGS. 4A and 4B are perspective views of the embodiment of FIG. 1, shown in both a first position and a second position, respectively.
Figure 4B:
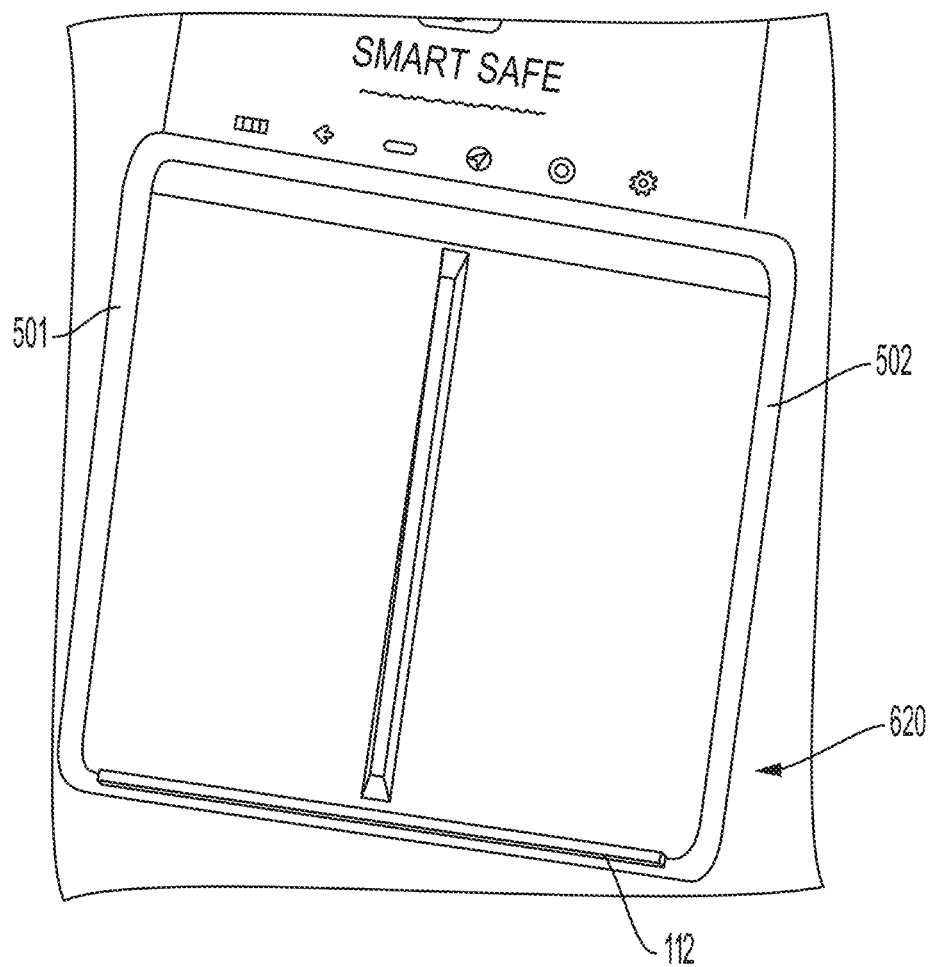

In some embodiments, as shown in FIG. 4, a first rail 501 may extend from the bottom member 106 to the top member 105 along the back surface 102. Further, in other embodiments, a second rail 502 may similarly extend from the bottom member to the top member along the back surface. In some embodiments, the first rail and the second rail are configured to actuate the device housing system 100 between a first position 610 and a second position 620, whereby access to the electronic device 1 is partially restricted when the device housing system 100 is in the first position 610, further incentivizing safe operation of the vehicle. In some embodiments, this actuation may be done along a plane parallel to the back surface 102.

The mechanism by which the first rail and the second rail actuate the device housing system may utilize any form of rails known in the art. For example, among others, the first rail and the second rail may utilize ball bearings or roller bearings. Additionally, in such embodiments, the first rail and the second rail may be manually actuated by the user. Embodiments exists where this actuation is achieved through use of a motor.

In some embodiments, the first rail 501 and the second rail 502 may extend for an entire length between the top member 105 and the bottom member 106. Alternatively, the first rail and the second rail may not extend the entire length between the top member and the bottom member and may extend only partially between the top member and the bottom member. Preferably, the first rail and the second rail are the same length to ensure that the device housing system 100 is level during actuation.

Similarly, in other embodiments, the device housing system 100 may include just one rail, e.g., the first rail or the second rail, or more than two rails to actuate the device housing system. In such embodiments, the rail or rails, respectively, may similarly be configured to actuate the device housing system between the first position and the second position.

In some embodiments, when the device housing system 100 is in the first position 610, as shown in part (a) of FIG. 4, the user's physical access to the internet-enabled device 1 may be restricted. Accordingly, such a configuration may make it more difficult for the user to physically reach the internet-enabled device. Therefore, most preferably, the user will actuate the device housing mechanism to the first position 610 when the vehicle is in motion, to facilitate better visibility of the vehicle's internal controls, and/or to temper the user's inclination to reach for the internet-enabled device.

Alternatively, in other embodiments, when the device housing system 100 is in the second position 620, as shown in part (b) of FIG. 4, the user may have full physical access to the internet-enabled device 1. Accordingly, such a configuration may provide no obstacles for the user to physically reach the internet-enabled device. Thus, most preferably, the user will actuate the device housing mechanism to the second position 620 when the vehicle is at rest.

Figure 5A:
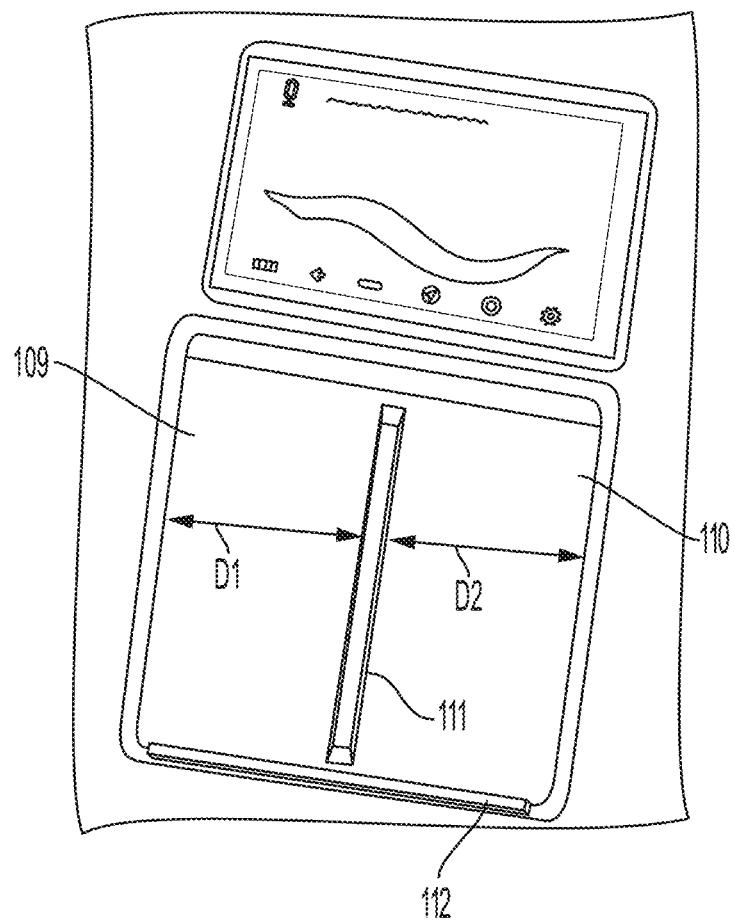
FIG. 5A is a perspective view of an alternative embodiment of the device housing system in accordance with the present disclosure.
Figure 5B:
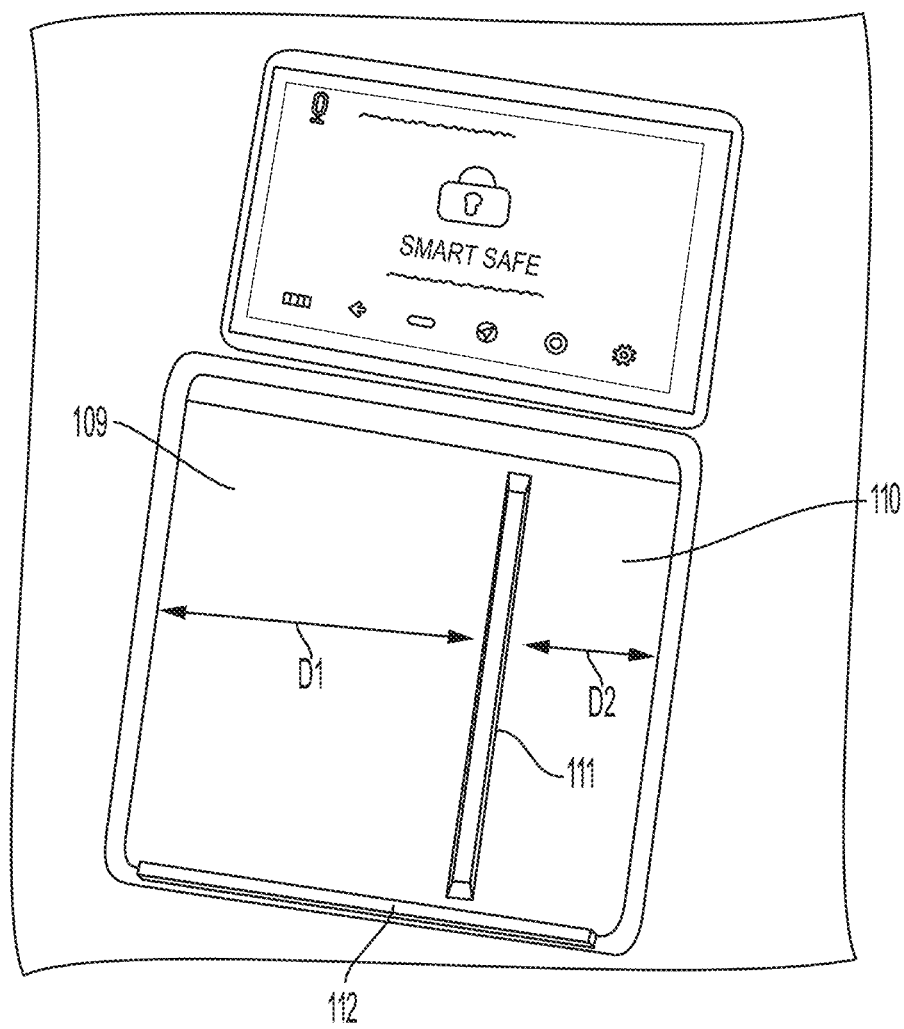
FIG. 5B is a perspective view of an alternative embodiment of the device housing system in accordance with the present disclosure.

In some embodiments, as shown in FIG. 5, the device housing system 100 may further include a middle member 111 located on the placement slot 107. In such embodiments, the middle member may extend between the top member 105 and the bottom member 106. Further, the middle member may extend in any direction on the placement slot 107. Preferably, the middle member 111 may extend in a direction parallel to the planes of the first side member 103 and the second side member 104 so as to maximize an area of the placement slot 107 configured to support the internet-enabled device 1.

In other embodiments, the middle member may extend for an entire length between the top member and the bottom member. Alternatively, in some embodiments, the middle member may not extend the entire length between the top member and the bottom member and may extend only partially between the top member and the bottom member.

In some embodiments, as also shown in FIG. 5, the middle member 111 may define a first placement sub-slot 109 and a second placement sub-slot 110. The first placement sub-slot may be further defined by a width, D1, which is a distance between the first side member 103 and the middle member. Similarly, the second placement sub-slot may be further defined by a width, D2, which is a distance between the second side member 104 and the middle member. In such embodiments, the first placement sub-slot 109 and the second placement sub-slot 110 may each be configured to hold at least one internet-enabled device 1.

In some embodiments, as shown in part (a) of FIG. 5, the middle member 111 may be located at a position equidistant from the first side member 103 and the second side member 104. In such embodiments, the width of the first placement sub-slot 109 and the width of the second placement sub-slot 110, that is, D1 and D2, respectively, are equal. Accordingly, such a configuration may allow for at least two larger internet-enabled devices, such as smartphones, to be comfortably placed on the first placement sub-slot and second placement sub-slot. Further, such a configuration may be considered for aesthetic reasons.

In some embodiments, as shown in part (b) of FIG. 5, the middle member 111 may not located at a position equidistant from the first side member 103 and the second side member 104. In such embodiments, the width of the first placement sub-slot 109 and the width of the second placement sub-slot 110, that is, D1 and D2, respectively, are not equal. Accordingly, such a configuration may allow for at least two internet-enabled devices of varying sizes, e.g., smartphone, smart watch, etc., to be comfortably placed on the first placement sub-slot and the second placement sub-slot.

In other embodiments, the device housing system 100 may contain more than one middle member 111, and thus, more than two placement sub-slots. Accordingly, such a configuration may allow for at least three internet-enabled devices to be comfortably placed on the placement slot 107.

Figure 6:
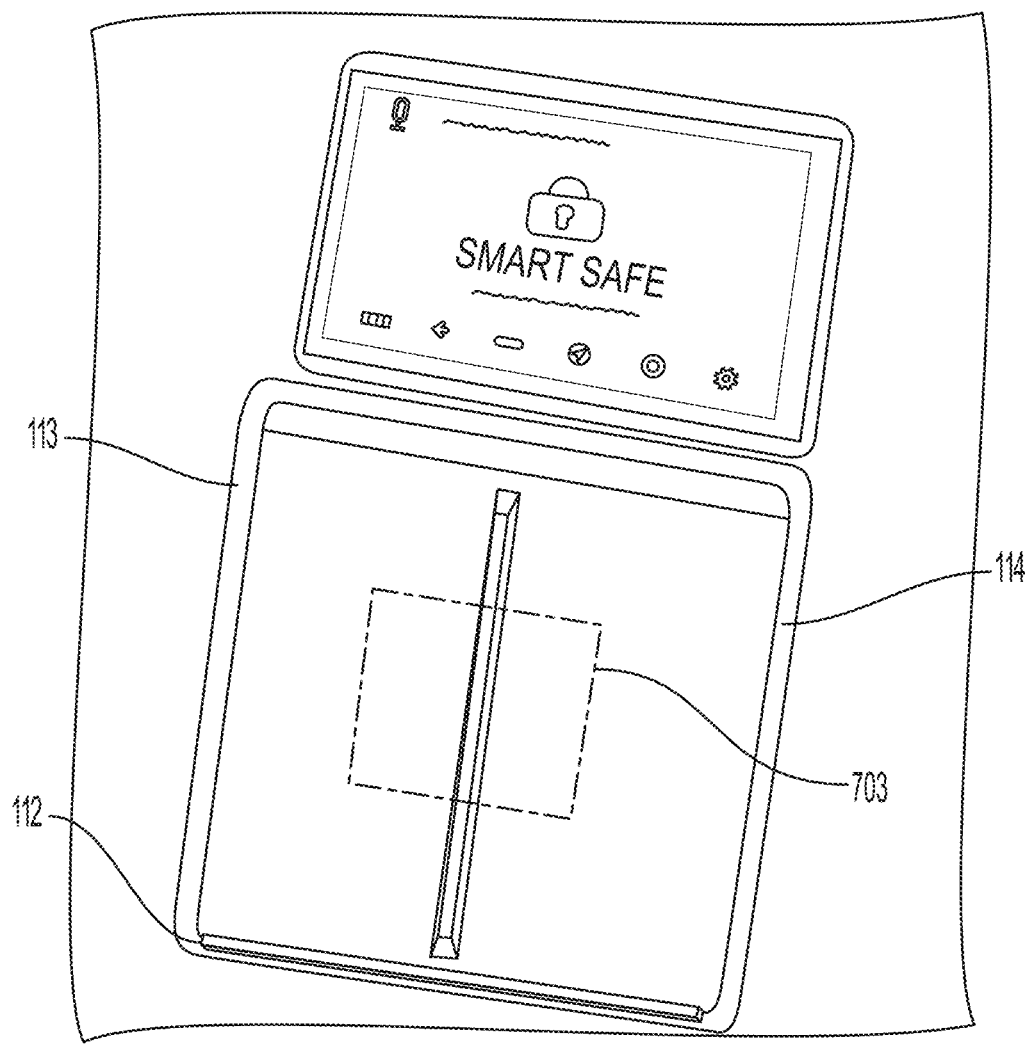
FIG. 6 is a perspective view of another embodiment of the device housing system in accordance with the present disclosure.

In some embodiments, as shown in FIG. 6, the placement slot 107 may further include a bottom ridge 112. The bottom ridge may have a member which extends from an intersection of the front surface 101 and the bottom member 106 to a point beyond the front surface. The bottom ridge may be configured to support the internet-enabled device 1 from below. In such embodiments, a length of the member which extends beyond the front surface may be of a length sufficient to further support at least one internet-enabled device from below.

In some embodiments, as shown in FIG. 6, the placement slot 107 may further include a first side ridge 113 having a first ridge member. The first ridge member may extend from an intersection of the front surface 101 and the first side member 103 to a point beyond the front surface. The first side ridge may be configured to further support the internet-enabled device 1 from the left. In such embodiments, a length of the first ridge member which extends beyond the front surface may be of a length sufficient to further support at least one internet-enabled device from the left. Similarly, in some embodiments, as shown in FIG. 6, the placement slot 107 may further include a second side ridge 114 having a second ridge member. The second ridge member may extend from an intersection of the front surface and the second side member to a point beyond the front surface. The second side ridge may be configured to further support the internet-enabled device 1 from the right. In such embodiments, the length of the second ridge member which extends beyond the front surface may be of a length sufficient to further support at least one internet-enabled device from the right. In other embodiments, a plane of the first side ridge 113 and a plane of the second side ridge 114 may be substantially parallel to one another.

In other embodiments, as further shown in FIG. 6, the device housing system 100 may include a charging unit 703. The type of charging unit may be any charging unit known in the art, although preferably is a charging unit configured to wirelessly charge an electronic device 1 disposed on the device housing system 100. In such embodiments, the charging unit may be configured to charge at least one internet-enabled device 1 disposed on the placement slot 107. Further, the charging unit may be configured to charge various classifications of internet-enabled devices at once, including, but not limited to, smartphones, smartwatches, and the like.

Figure 7:
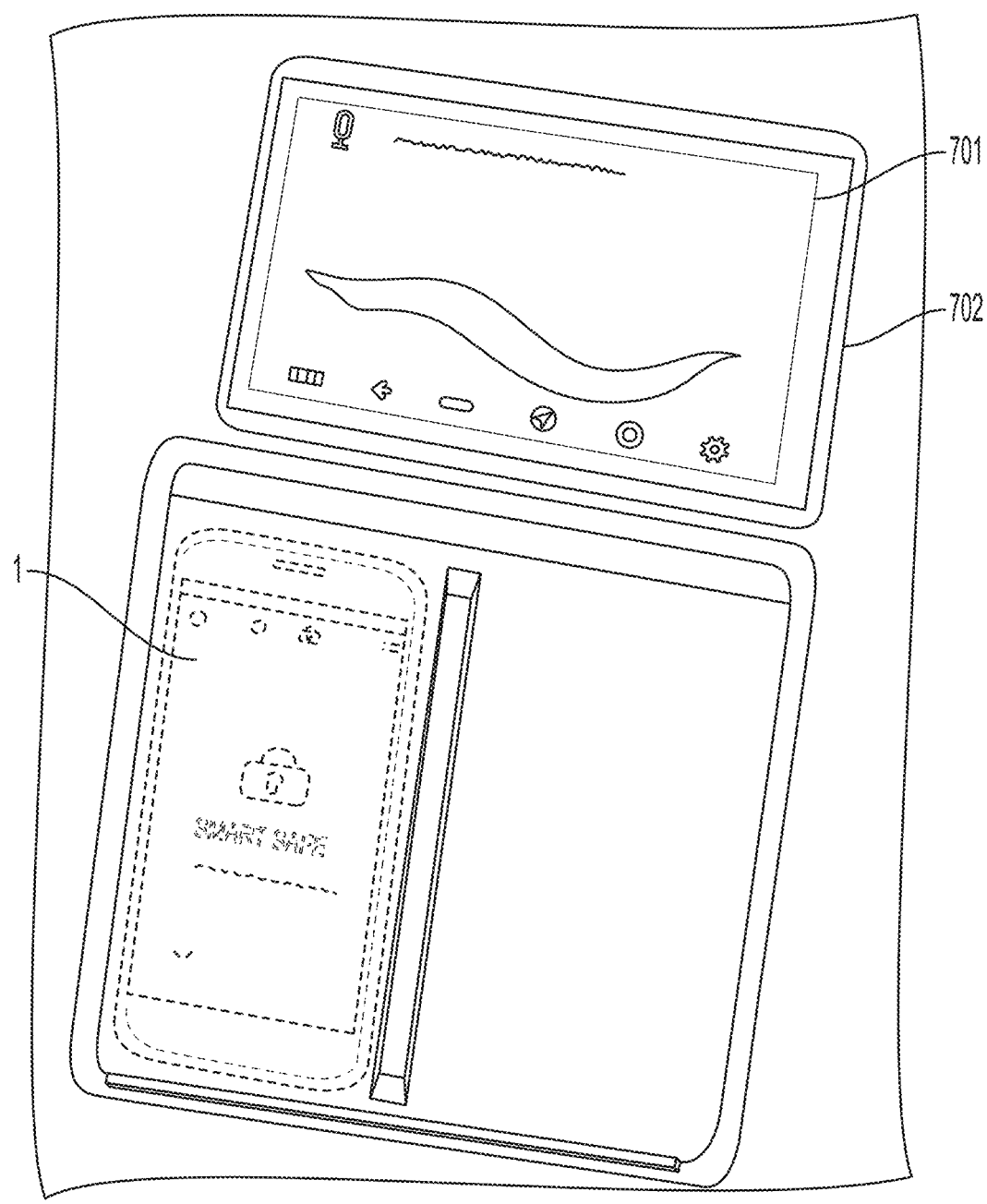
FIG. 7 is a perspective view of the embodiment of FIG. 1, highlighting the placement of an electronic device thereon.
Figure 8:
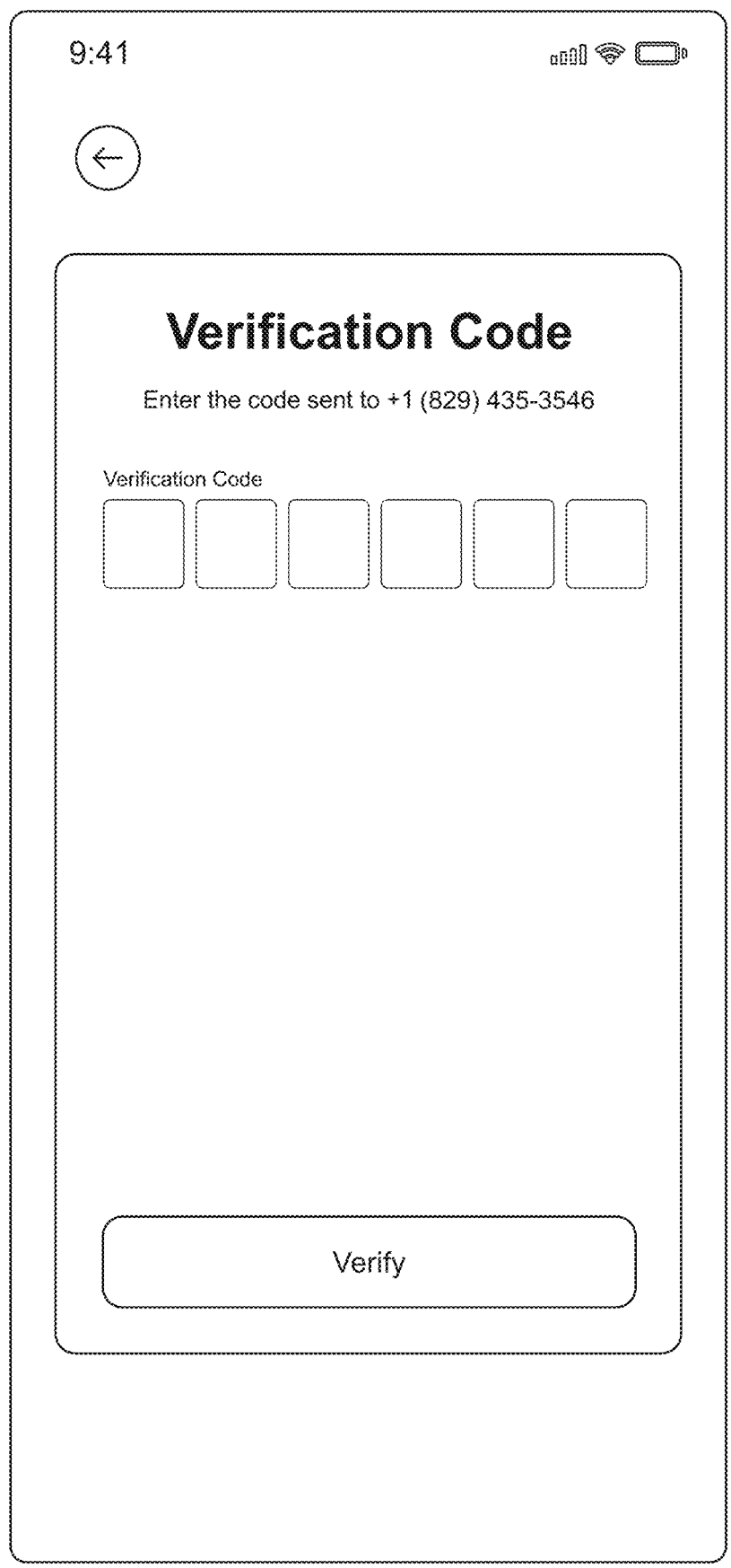
FIG. 8 shows an embodiment of a graphical user interface of software in accordance with the present disclosure where a user is prompted to enter a verification code.

In some embodiments, as shown in FIG. 7, the device housing system 100 may further include a digital screen 701 configured to display information to the user. The information displayed to the user may relate to the operational status of the internet-enabled device 1 or the vehicle. For example, the information displayed to the user may relate to whether the internet-enabled device is disabled, but the information displayed to the user is not limited thereto. Moreover, in such embodiments, the digital screen may be configured to be touch screen.

In some embodiments, as shown in FIG. 7, the device housing system 100 may further include a speaker 702 configured to audibly alert the user that the internet-enabled device 1 is disabled. The audial information emitted to the user may relate to the operational status of the internet-enabled device or the vehicle. For example, the information emitted to the user may relate to whether the internet-enabled device is disabled, but the information emitted to the user is not limited thereto.

In some embodiments, the speaker 702 may be located anywhere on the device housing system 100. Preferably, the speaker may be located on the back surface 102. More preferably, the speaker may be located behind the digital screen 701 so as to emit substantially unmuffled audial information to the user.

In some embodiments, the front surface 101 may be manufactured from a material configured to limit the movement of the internet-enabled device 1 placed thereon. The material used on the front surface 101 may include material known in the art which restricts movement. More specifically, the material may restrict movement of the internet-enabled device placed on the device housing system 100 via intermolecular forces, e.g., friction and/or adhesion between the internet-enabled electronic device 1 and the device housing system 100. For example, the material of the front surface may be constructed out of one or more of either rubber, polyvinyl chloride, thermoplastic elastomer, thermoplastic polyurethane, foam, sponge, cork, adhesive tape, or non-slip tape. Accordingly, such configurations may offer advantages, such as limiting and/or preventing movement of the internet-enabled device on or off the front surface.

In some embodiments, the device housing system 100 may be constructed out of an antipathogen plastic or antipathogen composite. In such embodiments, "antipathogen plastic" or "antipathogen composite" may be construed to include plastics or composites, respectively, that have antiviral and/or antimicrobial properties. For example, antiviral plastics or composites may be capable of killing 99.9999% of viruses, such as the SARS-CoV-2 virus, on material surfaces in 60 minutes or less. Similarly, antimicrobial plastics or composites may include materials that contain an active ingredient which prevents microbial growth. Accordingly, the device housing system may be constructed out of graphene-thermoplastic polyurethane (G-TPU), silver, copper, linoleum, or any other material with anti-viral and/or anti-microbial properties.

Various other embodiments of the device housing system in accordance with the present disclosure are contemplated. In some embodiments, the device housing system can interface with one or more seatbelts of the vehicle in which the device housing system is installed. By interfacing with these one or more seatbelts, the device housing system in accordance with the present disclosure can provide an additional safeguard for drivers to ensure that the vehicle is being operated safely. Embodiments exist where a user must secure their mobile device within the device housing system and must have their seatbelt fastened in order to operate the vehicle. This restriction in operation can be in the form of preventing the vehicle from starting or can be in the form of preventing the vehicle from entering drive. In other embodiments, this restriction is in the form of engaging the standard brakes and/or emergency brakes until both conditions are satisfied. Embodiments exist where the radio must also be muted in order for the vehicle to be operated. In some embodiments, the device housing system in accordance with the present disclosure is configured to safely pull the vehicle over if it is detected that the user's mobile device is removed from the device housing system after the vehicle has begun operation.

Further embodiments exist where the device housing system in accordance with the present disclosure assesses not only whether a user has fastened their seatbelt, but also, through use of one or more image capture devices in electronic communication with said device housing system will scan the eyes of the driver for any signs of intoxication. In such embodiments and other embodiments, impairment is assessed by presenting the user with one or more visual stimuli, tracking, by the image capture device, eye movements of the user in relation to the one or more visual stimuli, and assessing, via the software application performing a horizontal gaze nystagmus test, whether the user is impaired. In these embodiments, a camera feature on the electronic device will be utilized to perform this test. Preferably, a system utilizing artificial intelligence will analyze the user's eye movements to detect any signs of involuntary jerking, which can indicate impairment or drowsiness of the user. Embodiments also exist where impairment is assessed by presenting the user with one or more visual stimuli, tracking, by the image capture device, eye movements of the user in relation to the one or more visual stimuli, and assessing, via the software application performing a psychomotor visual test, whether the user is impaired. If the user is impaired, then the device housing system will prevent the vehicle from being operated, either by preventing it from being started and/or preventing the vehicle from being placed in drive.

Embodiments exist where the device housing system in accordance with the present disclosure checks for whether the driver and any passengers have fastened their seatbelts, and whether the driver's mobile device has been placed within the device housing system before permitting the vehicle to be operated. Embodiments exists where all passengers in the vehicle must place their mobile devices within the device housing system and have their seatbelts fastened prior to the device housing system permitting operation of the vehicle.

In some embodiments, the system in accordance with the present disclosure is equipped with a "teenage mode." That is, said system can be configured to have two use modes, one for adult users of the vehicle and one for younger users of the vehicle, such as teenagers. During operation of vehicles equipped with the system in accordance with the present disclosure, when in teenage mode, said system can restrict maximum speeds of the vehicle, and can place limits on the volume of audio emitted by the vehicle, including preventing the vehicle from omitting any audio whatsoever. Additionally, said system can provide alerts to a remote device via the Internet when the vehicle leaves a pre-set geofenced zone. Embodiments exist where the system in accordance with the present disclosure will monitor the driving behavior of the driver, including monitoring acceleration patterns and braking patterns. In some embodiments, the system in accordance with the present disclosure will also restrict operation of the vehicle outside of pre-approved operation hours. Embodiments also exist where the system in accordance with the present disclosure places restrictions on drivers making phone calls, even when their mobile device is secured within the safe body.

In some embodiments, the system in accordance with the present disclosure further comprises a designated button on a steering wheel of the vehicle which must be engaged as part of said system permitting operation of the vehicle. Other embodiment exist where the system in accordance with the present disclosure further comprises on or more sources of oxygen which are in fluid communication with a cabin of the vehicle. The system in accordance with the present disclosure is configured to selectively add oxygen to a cabin of the vehicle.

Embodiments exists where a user must blow into the breathalyzer as part of the system in accordance with the present disclosure permitting operation of the vehicle, and upon verifying that the user's BAC is below the legal limit within the user's jurisdiction, in addition to the phone of the driver being placed within the device housing system, the system in accordance with the present disclosure will permit operation of the vehicle. Additionally, said system can inform teenage drivers that if they use a second, unregistered mobile device while operating the vehicle they can be liable for any damages they cause.

Embodiments exist where the system in accordance with the present disclosure has a mode for use with teenage drivers which can be set by a super user such as a parent. In such embodiments, the system in accordance with the present disclosure will prompt the super user to navigate to a settings menu while the vehicle is in park where the teen driving mode can be selected. To start, the super user will create a PIN which will prevent the teenage driver from later changing any settings without permission. In some embodiments, the super user will be able to pair a key fob or other RFID-based device to provide for an easy override of the teen driving settings. In some embodiments, the system in accordance with the present disclosure will only limit operation of the vehicle when teen mode is engaged. Embodiments exists where the super user will be provided with reports on the performance of the teen driver, including time driven, average speed, average acceleration, and distance traveled. In other embodiments, the system in accordance with the present disclosure will provide audio warnings to encourage safe driving. In other embodiments, the system in accordance with the present disclosure will provide a warning on the display of the electronic device that it is unsafe to text while driving when users attempt to text while driving. In such embodiments, in addition to a notification displaying on the screen of the electronic device, a notification can also be sent electronically to a third party such as a parent or fleet manager. In some embodiments, this notification can also be sent to an insurance company affiliated with the user.

In other embodiments, one or more components of the device housing system 100 may be independently, fully or partially, constructed of a recycled material, a lightweight material, a waterproof material, or a combination thereof. In some embodiments, the system in accordance with the present disclosure is equipped with an image capture device, and this image capture device can provide a live video feed of the teenage driver to the super user or other third party. Embodiments exist where the system in accordance with the present disclosure can utilize the image capture device to detect the presence of an unregistered mobile device being used by the driver. Upon detection, the system in accordance with the present disclosure will cause the vehicle to safely cease operation. Embodiments exist where said image capture device records a video feed during all times that the vehicle is in operation. In embodiments, the super user may track the location and speed of the user.

In some embodiments, the components of the device housing system 100 may be fastened to one another using any fastening means known in the art. For example, the components of the device housing system may be fastened to one another via bolts, nails, latches, clamps, adhesives, or a combination thereof, but the present disclosure is not limited thereto. Furthermore, in such embodiments, the components of the device housing system may be permanently attached to one another so as to maintain the structure and rigidity of the device housing system.

In some embodiments, the device housing system 100 may be permanently attached to the vehicle via bolts, nails, latches, clamps, adhesives, or a combination thereof, but the present disclosure is not limited thereto. Such a configuration may ensure that the device housing system does not detach from the vehicle during normal driving conditions or occurrences. In other embodiments, the device housing system may be removably attached from the vehicle to facilitate ease of replacement and/or repair.

Figure 9:
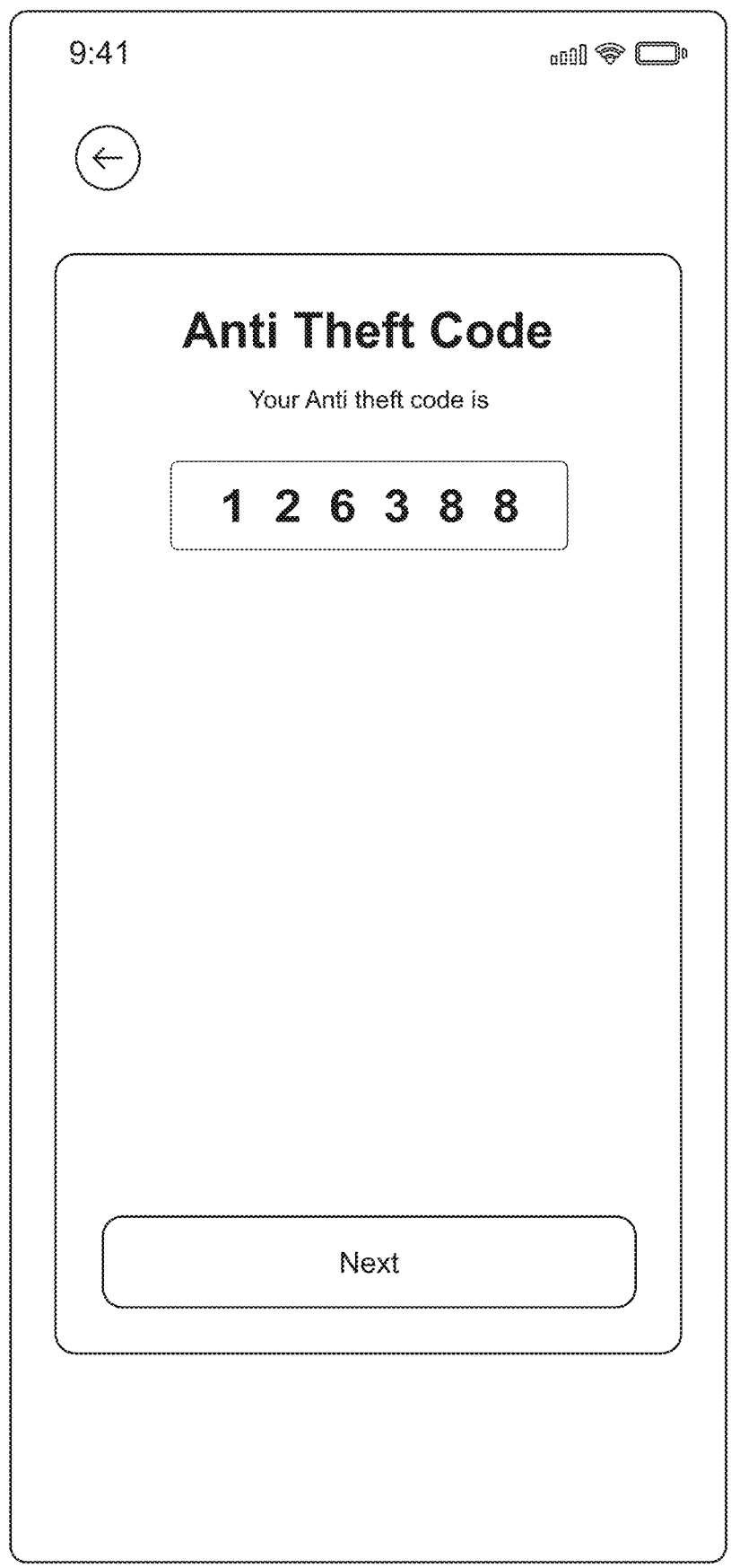
FIG. 9 shows an embodiment of a graphical user interface of software in accordance with the present disclosure where a user enters an anti-theft code.

Embodiments exist where a software application which interfaces with the device housing system 100 is provided. In such embodiments, this software application can include both parent modes and teenage modes to allow for easy supervision of a young driver using the vehicle. There, each of these modes will allow for parent users and child users to have a profile page which includes the user's phone number and email address. Embodiments of the software exist that also provide for a commercial driver mode where a super user such as an employer can monitor and ensure that the commercial drivers are driving safely and without improperly utilizing a mobile device while operating the vehicle. For both the parent mode and the commercial driver mode, users must first register their electronic device with the device housing system 100 through the scanning of a QR code which will direct them to a registration screen on the software in accordance with the present disclosure. During registration, the user will input their name, phone number, and emergency contact information. Upon the entry of this information, they will have to verify their device through a 6-digit verification code, as shown in FIG. 9. Embodiments exist where the user will have to register the vehicle with the system in accordance with the present disclosure, and such vehicle registration will include a VIN or HIN of the vehicle, the license plate for the vehicle, as well as a make and model for the vehicle.

In some embodiments, a commercial driver will first have to complete a daily checklist prior to being permitted to operate the vehicle. Such checklists can include looking into the state of the tires and wheels of the vehicle, the lights and turn signals in the vehicle, the brakes of the vehicle, the level of all fluids in the vehicle, the windshield wipers of the vehicle, any cargo securement mechanisms, the mirrors and other visibility tools, the exhaust system, and the horn system. Some embodiments of the checklist will also require the user to enter information about their wellness including how many hours the user has previously slept, as well as the weather. Some embodiments exist where this checklist is set by a government agency such as DOTT. In such embodiments, the checklist can include checking for visible damage to the truck and trailer, inspect the tires for proper inflation and tread depth, checking all lights, cleaning all mirrors, checking the engine oil level, inspecting the coolant level, verify brake fluid and power steering fluid levels, and checking the windshield washer fluid. This inspection can also include inspecting the cargo area for damage and cleanliness, checking that all hazardous materials are properly labelled and secured, to check that all permits and registrations are up to date, verifying the user's driver's license is valid, and ensuring that all necessary insurance documents are readily available. In such embodiments, the system in accordance with the present disclosure will monitor the activities of the user for the purposes of determining proper payroll for the user. This duration can be calculated by the amount of time the user's mobile device is within the device housing system. In some embodiments, the system in accordance with the present disclosure offers advanced controls and features such as anti-theft protection, impairment identification, driver verification, insurance policy agreements, punch clock functionality, onboard camera monitoring, and driver habit monitoring. It will also monitor the driver's habits, such as instances of speeding. In at least one embodiment, once the user enters the anti-theft code into the software in accordance with the present disclosure, said software will lock the screen of the user's electronic device. Once this screen has been locked, then operation of the vehicle will be permitted. If the user turns off the engine of the vehicle, then the screen of user's electronic device will be unlocked. In some embodiments, after the user has entered the anti-thefy code, a visual alert will appear on the user's electronic device reminding them that texting and driving can lead to car accidents.

Embodiments exist where the user may submit a hazard report to log any issues that the user has while operating the vehicle. For example, in embodiments where the system in accordance with the present disclosure is used with commercial drivers, this information could be transmitted to the fleet manager. Embodiments exist where information about the users is summarized and presented to this fleet manager. In various embodiments, upon start of the vehicle the user will be prompted with a reminder, such as to perform the annual inspection and other routine maintenance tasks, as needed. In some embodiments, the phone holding device is mounted on a dashboard of the vehicle such that when the user's electronic device is placed within the phone holding device the front camera of the electronic will be used to monitor the cabin for the presence of a second electronic device within the vehicle and a rear camera of the electronic device will capture and store footage of what is ahead of the vehicle. In such embodiments, when the recordings are stored, they may be stored for up to a month or longer, depending on storage capacity and user preference. In some embodiments, the system in accordance with the present disclosure will be equipped with anti-spoofing technology that will allow the system to detect whether it is being presented with a falsified image. In one embodiment, the recorded videos will have a watermark. In various embodiments, the system in accordance with the present disclosure will track the user's driving and if the user repeatedly exceeds the speed limit, frequently changes lanes, or drives too close to another vehicle, an alert will be sent to the superuser. Embodiments exist where the user will receive an anti-theft code each time the user places their electronic device within the phone holding system, and this code can be entered into the software in accordance with the present disclosure to allow easy and secure operation of the vehicle. In some embodiments, all of the user's contacts will receive an automated message while the user is operating the vehicle, and this message will include the user's name and ETA. Upon the receipt of this message, contacts will be allowed to call the user, who has access to Bluetooth. In some embodiments, the system in accordance with the present disclosure will allow the superuser to configure whether an insurance company or the superuser is informed when text messages are sent from the user's device.

In some embodiments, the system in accordance with the present disclosure can restrict access to all software application on the user's electronic device. In other embodiments, the system in accordance with the present disclosure can restrict access to certain software applications on the user's device. In embodiments, applications offered by the vehicle's manufacturer will always be accessible. In various embodiments, the system in accordance with the present disclosure will restrict operation of the vehicle until an anti-theft code is entered into the software in accordance with the present disclosure. Such restriction can be either preventing the vehicle from starting or preventing the vehicle from being placed into drive.

In various embodiments, users may be presented with notifications in certain circumstances. Such circumstances can include notifications to not try to access the phone, information about potential inclement weather, or other relevant information for safe operation of the vehicle. Embodiments exist where the system in accordance with the present disclosure will monitor the time spent operating the vehicle to ensure compliance with local labor laws. IN jurisdictions that cap the amount of hours a commercial driver way work in a given day, as the user approaches this limit they will receive a notification to pull over and book a hotel. Embodiments exist where drivers are also required to complete a checklist while operating the vehicle. In these embodiments, the checklist can include ensuring that the driver's seatbelt is fastened, that all traffic laws and regulations are followed, that the driver always signals while turning, checking mirrors and blind spots, remaining aware of road conditions and modifying driving style accordingly, monitoring gauges on the vehicle for anomalies. Embodiments exists where the driver must also complete a post-trip inspection and log the results in the software in accordance with the present disclosure. In these embodiments the post-trip inspection can include checking for any new damage, ensuring all lights remain functioning, inspecting all tires for wear and tear, confirming all cargo has been delivered, completing any trip logs, submitting maintenance requests as needed, and remove all trash and debris from the interior and car.

In various embodiments, the system in accordance with the present disclosure will notify the driver of any accidents on the road. In some embodiments, the user will be warned via a notification if they attempt to access the phone while operating the vehicle. Embodiments exist where the system in accordance with the present disclosure where if the user is recorded as repeatedly engaging in unsafe driving a message is sent to a third party such as a parent or fleet manager about the unsafe driving. In other embodiments, if someone attempts to message the user while their electronic device is contained within the phone holding system then an automatic reply will be sent that the user is driving. Embodiments exist where the system in accordance with the present disclosure can interface with smart homes to result in certain automations as the user leaves or approaches their home. In these embodiments, the system in accordance with the present disclosure will notify emergency contacts and first responders in the event of a car accident. In an embodiment, the system in accordance with the present disclosure can be used to remind users where the vehicle is parked and can also inform the user of local gas stations and the price of gas at each of these stations.

Figure 10:
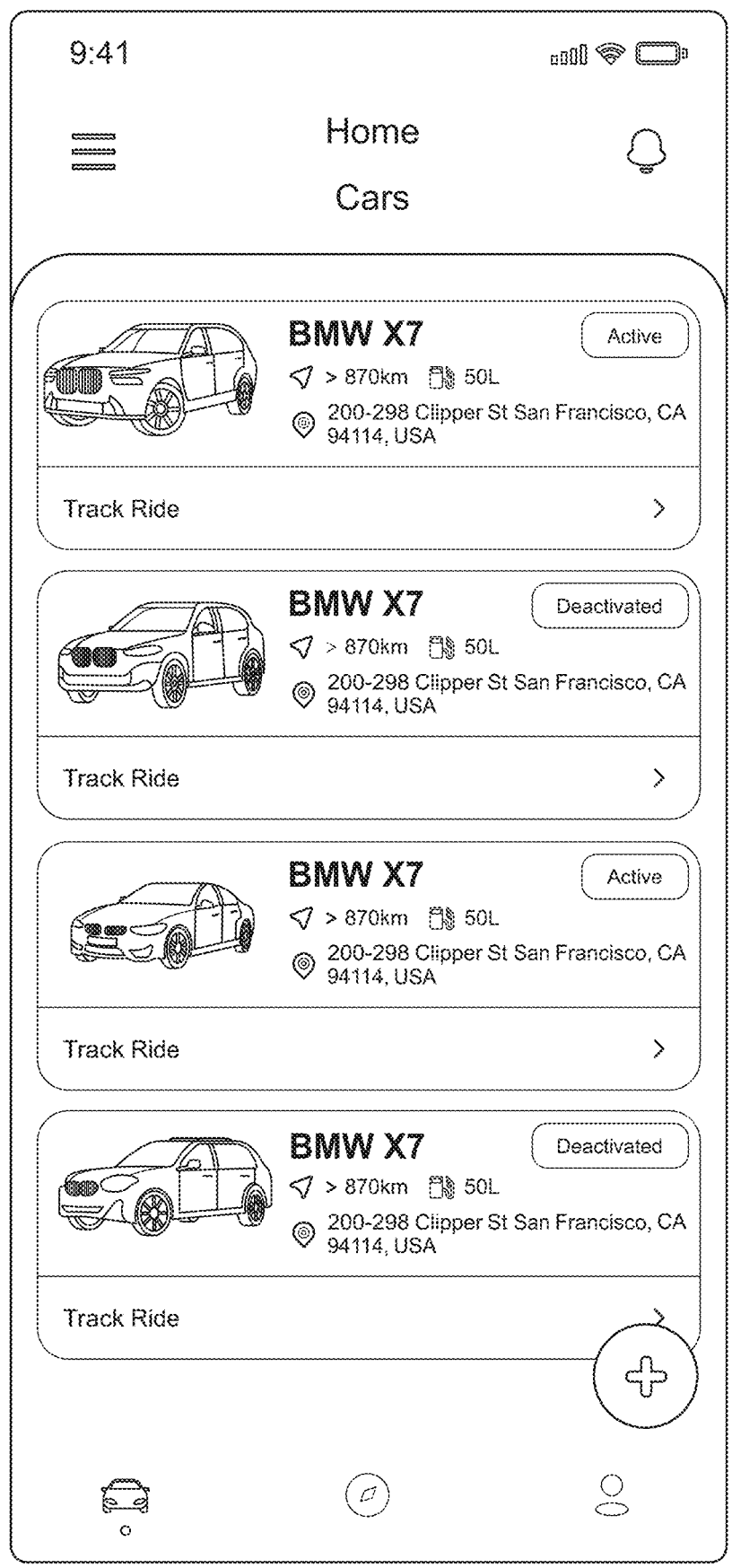
FIG. 10 shows an embodiment of a graphical user interface of software in accordance with the present disclosure where a user is presented with an overview of registered vehicles.
Figure 11:
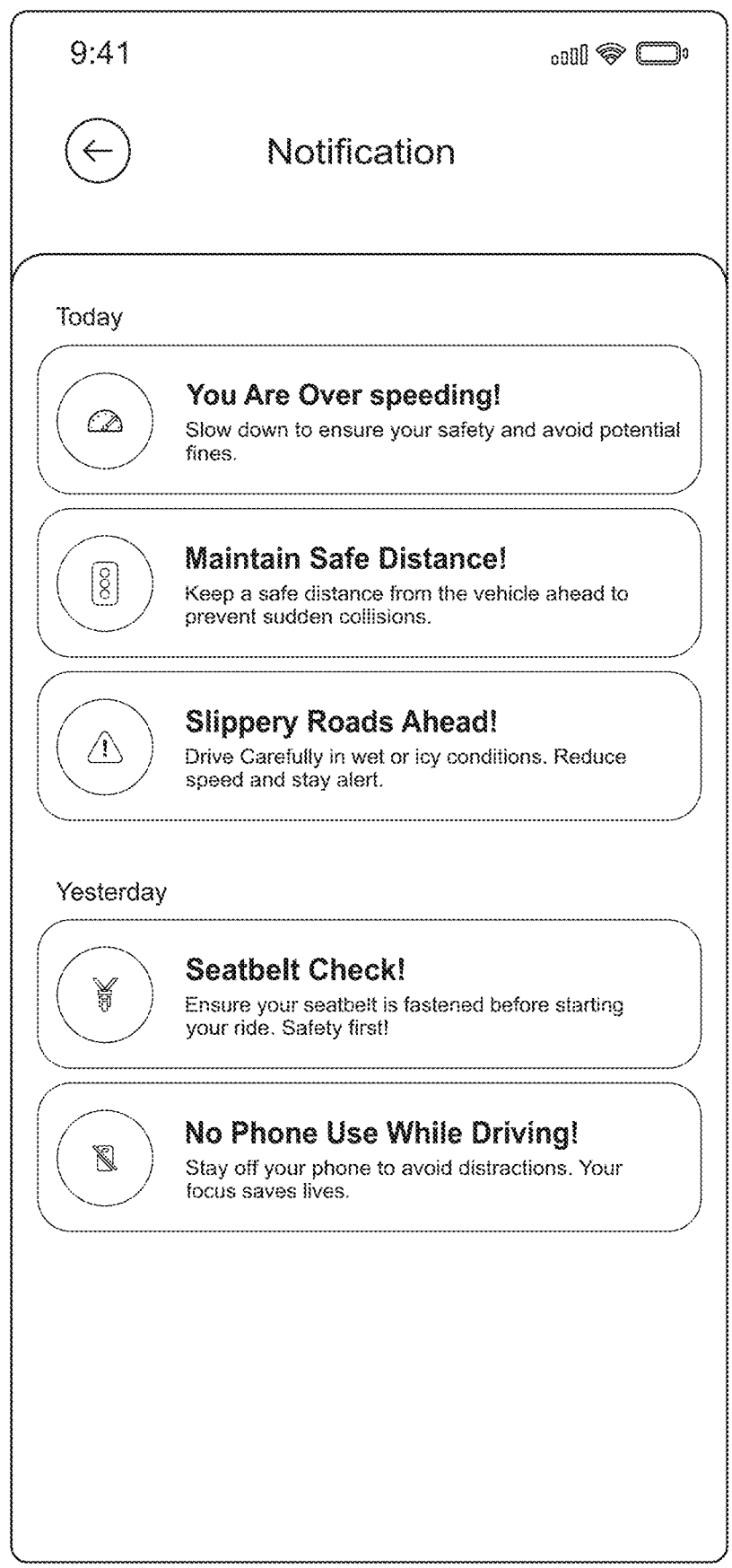
FIG. 11 shows an embodiment of a graphical user interface of software in accordance with the present disclosure where a user is presented with a summary of notifications.
Figure 12:
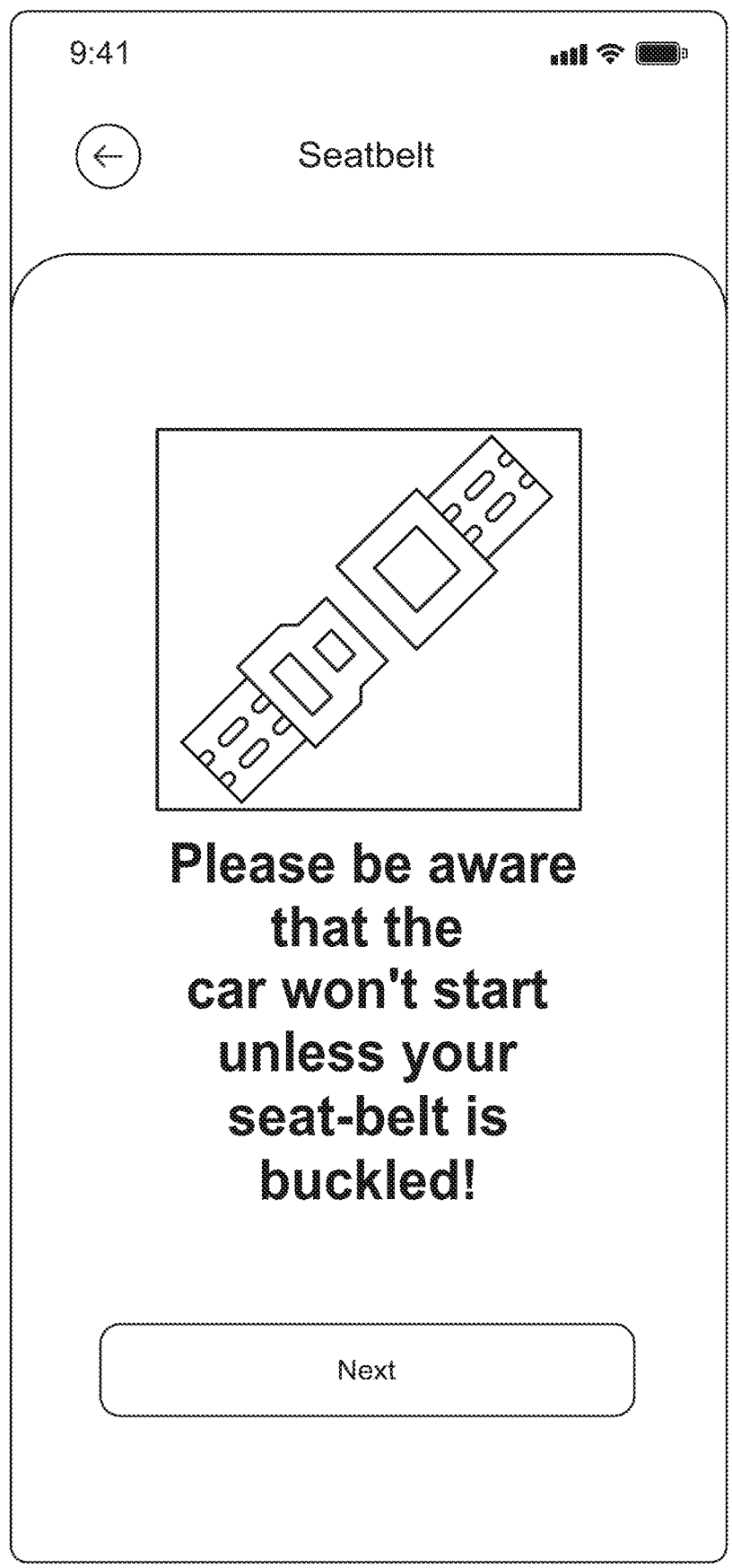
FIG. 12 shows an embodiment of a graphical user interface of software in accordance with the present disclosure where a user is presented with a safety notification.
Figure 13:
FIG. 13 shows an embodiment of a graphical user interface of software in accordance with the present disclosure where a user is presented with an overview of all connected vehicles.
Figure 14:
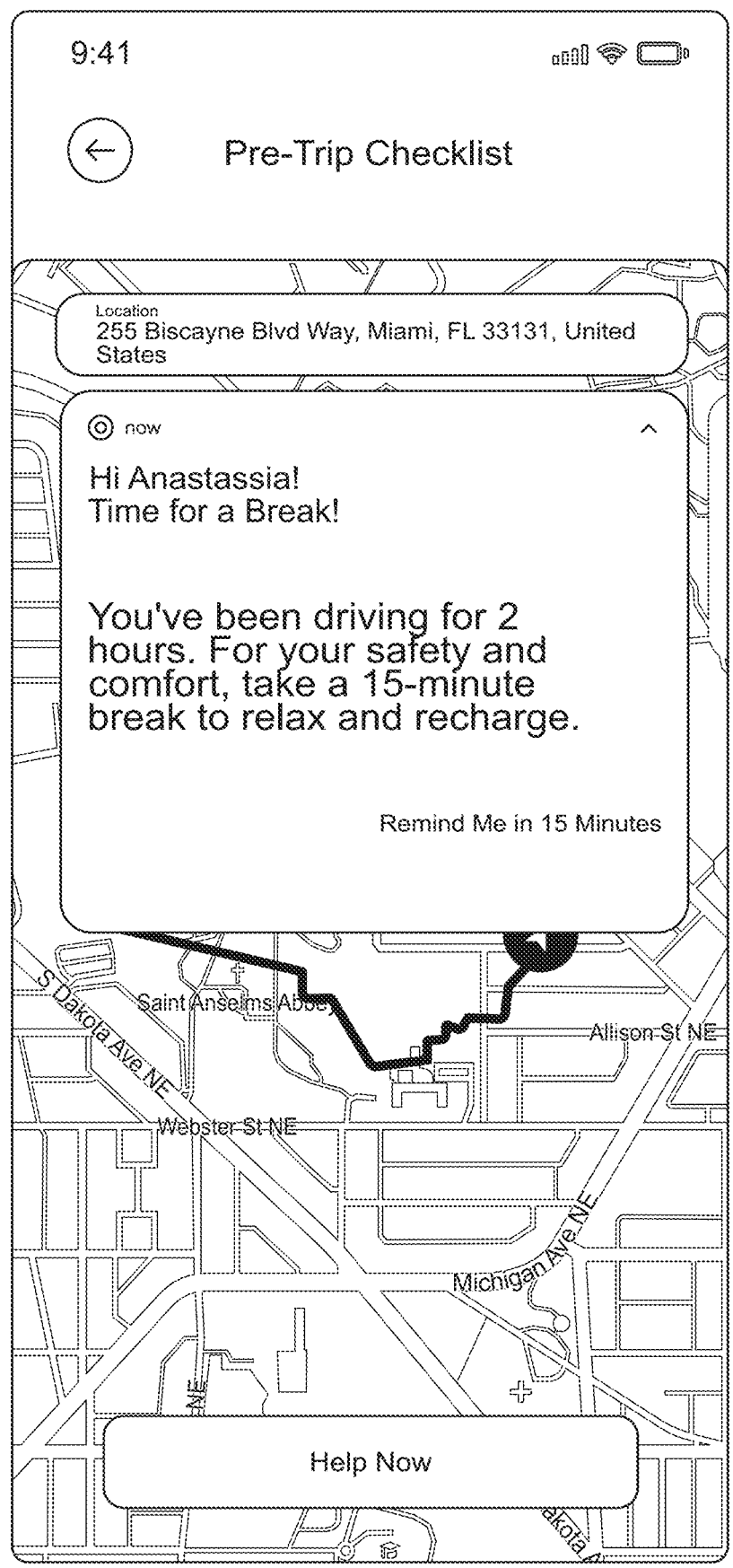
FIG. 14 shows an embodiment of a graphical user interface of software in accordance with the present disclosure where a user is presented with a pre-trip checklist.

Embodiments exist where users must successfully complete a reaction time test presented on the software in accordance with the present disclosure in order to permit operation of the vehicle. In some embodiments, voice assistants on the electronic device remain accessible even when the phone is secured within the phone holding device. In an embodiment, the system in accordance with the present disclosure can allow a superuser to monitor multiple vehicles, as shown in FIG. 10. This is true for both young drivers and commercial drivers. Embodiments exist where the system in accordance with the present disclosure can be put into a valet mode which temporarily blocks the restrictions on operation of the vehicle. In some embodiments, the commercial driver will have to fill out forms upon the completion of their trip, either in print or digital format. Such forms can include MCS 59, MSC 139, and MSC 139A. Embodiments also exist where, when the user's electronic device is secured within the phone holding device, and regulations mandate that the electronic device be stowed or locked, the restricted software applications may be integrated directly into the vehicle.

The size, shape, orientation, and configuration of device housing system components are not limited to what is illustrated in the FIG. 1 to FIGS. 2 and FIG. 4 to FIG. 7. Those skilled in the art will appreciate that any suitable configuration of device housing system components is within the scope of the present disclosure.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," and "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a "first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents. Implementations may also include one or a combination of any two or more of the aforementioned features or embodiments.

For purposes of the present disclosure of the invention in accordance with the present disclosure, unless specifically disclaimed, the singular includes the plural and vice-versa, the words "and" and "or" shall be both conjunctive and disjunctive, the words "any" and "all" shall both mean "any and all".

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As the invention in accordance with the present disclosure has been described in connection with what is presently considered to be the most practical and various embodiments, it is to be understood that the disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the disclosure, including the best mode, and also to enable any person skilled in the art to practice the disclosure, including making and using any devices or systems and performing any incorporated methods. The patentable scope of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

The disclosure is illustrated throughout the written description. It should be understood that numerous variations are possible while adhering to the inventive concept. Such variations are contemplated as being a part of the present disclosure.

The invention claimed is:

1. A method of ensuring safe driving, comprising the steps of:
   providing, a device housing system contained within a vehicle, the device housing system comprising a placement slot configured to receive and support an internet-enabled electronic device;
   entering the vehicle by a young driver;
   registering the internet-enabled electronic device with the device housing system, thereby creating a wireless electronic communication channel therebetween;
   placing, by the young driver, the internet-enabled electronic device of the driver into the placement slot;
   automatically transmitting an anti-theft code to the internet-enabled electronic device upon placement of the internet-enabled electronic device;
   entering the anti-theft code into a graphical user interface presented on the internet-enabled electronic device;
   fastening, by the young driver, a seatbelt corresponding to a seat in the vehicle which is occupied by the young driver;
   preventing operation, by the device housing system, of one or more software applications on the internet-enabled electronic device, where the one or more software applications are ordinarily accessible by the young driver utilizing the internet-enabled electronic device;
   permitting, upon verification of the anti-theft code and verification of fastening of the seatbelt, by the device housing system, operation of the vehicle.

2. The method of claim 1, the internet-enabled electronic device comprising at least one camera, and wherein the step of registering the internet-enabled electronic device with the device housing system is performed via the at least one camera scanning an optical identifier located on the device housing system.

3. The method of claim 1, further comprising the steps of:
   sensing by the device housing system if the internet-enabled electronic device is within the placement slot;
   preventing operation of the vehicle, by the device housing system, if the internet-enabled electronic device is removed from the placement slot.

4. The method of claim 2, further comprising the step of:
   assessing, via the at least one camera whether a second internet-enabled electronic device is located within the vehicle and preventing operation of the vehicle, by the device housing system upon detection of the second internet-enabled electronic device.

5. The method of claim 4, further comprising the step of assessing via the at least one camera whether a human driver is present in the vehicle.

6. The method of claim 5, the internet-enabled electronic device having two cameras, the method further comprising the steps of:
   monitoring by one of the two cameras an area ahead of the vehicle and recording a video thereof; and
   storing the video on the internet-enabled electronic device.

7. The method of claim 6, further comprising the step of providing a second graphical user interface for allowing the young driver to catalog any damage to the vehicle or other hazards.

8. The method of claim 1, the device housing system further comprising a wireless charger configured to charge the internet-enabled electronic device when placed within the placement slot.

9. The method of claim 8, wherein the step of permitting, by the device housing system, operation of the vehicle is permitting the vehicle to be placed into drive.

10. The method of claim 8, wherein the step of permitting operation of the vehicle is permitting an engine of the vehicle to be started.

11. A method of ensuring safe driving, comprising the steps of:
    providing, a device housing system contained within a vehicle, the device housing system comprising a placement slot configured to receive and support an internet-enabled electronic device;
    performing a pre-trip inspection checklist by a commercial driver;
    entering one or more results of the pre-trip inspection checklist into a software application on the internet-enabled electronic device;
    entering the vehicle by the commercial driver;
    registering the internet-enabled electronic device with the device housing system, thereby creating a wireless electronic communication channel therebetween;
    placing, by the commercial driver, the internet-enabled electronic device of the commercial driver into the placement slot;
    automatically transmitting an anti-theft code to the internet-enabled electronic device upon placement of the internet-enabled electronic device;
    entering the anti-theft code into a graphical user interface presented on the internet-enabled electronic device;
    fastening, by the commercial driver, a seatbelt corresponding to a seat in the vehicle which is occupied by the commercial driver;
    preventing access, by the device housing system to one or more software applications on the internet-enabled electronic device, where the one or more software applications are ordinarily accessible by the commercial driver utilizing the internet-enabled electronic device;
    permitting, upon verification of the anti-theft code and verification of fastening of the seatbelt by the commercial driver, by the device housing system, operation of the vehicle.

12. The method of claim 11, the device housing system further comprising a wireless charger configured to charge the internet-enabled electronic device when placed within the placement slot.

13. The method of claim 12, wherein the step of permitting, by the device housing system, operation of the vehicle is permitting the vehicle to be placed into drive.

14. The method of claim 12, wherein the step of permitting operation of the vehicle is permitting an engine of the vehicle to be started.

15. The method of claim 11, further comprising the steps of:
    sensing by the device housing system if the internet-enabled electronic device is within the placement slot;
    preventing operation of the vehicle, by the device housing system, if the internet-enabled electronic device is removed from the placement slot.

16. The method of claim 15, wherein the step of preventing operation of the vehicle, by the device housing system, if the internet-enabled electronic device is removed from the placement slot is achieved by slowly reducing the speed of the vehicle until the vehicle is stopped.

17. The method of claim 11, further comprising the step of assessing, by the device housing system an amount of time spent operating the vehicle by the commercial driver and transmitting that amount of time to a third party payroll provider.

18. The method of claim 11, the device housing system further comprising a breathalyzer and the verification comprising the steps of:
    blowing into the breathalyzer by the commercial driver to provide a value of blood alcohol content of the commercial driver;
    determining whether the value of blood alcohol content is under 0.8;
    preventing operation of the vehicle if the value of blood alcohol content is over 0.8.

19. The method of claim 11, further comprising the steps of presenting the commercial driver with one or more visual stimuli;
    tracking, by an image capture device in electronic communication with the device housing system, one or more eye movements of the commercial driver in relation to the one or more visual stimuli;
    assessing, via the software application performing a horizontal gaze nystagmus test, whether the commercial driver is impaired.

20. The method of claim 11, the device housing system being configured to interface with one or more sensors to determine a speed and a direction of the vehicle, the method further comprising the step of:
    assessing, by the device housing system, whether the commercial driver is speeding or engaging in improper lane changes;
    transmitting this information to a third party.

\* \* \* \* \*